(No Model.)

2 Sheets—Sheet 1.

F. J. PATTEN.
METHOD OF OPERATING ELECTRIC MOTORS.

No. 410,988.

Patented Sept. 10, 1889.

Witnesses
Geo. W. Breck.
C. E. Ashley

Inventor
Francis Jarvis Patten.

By Attorney (No Model.) 2 Sheets—Sheet 2.

F. J. PATTEN.
METHOD OF OPERATING ELECTRIC MOTORS.

No. 410,988. Patented Sept. 10, 1889.

Witnesses
Geo. W. Breck.
C. E. Ashley.

Inventor
Francis James Patten
By Attorney

UNITED STATES PATENT OFFICE.

FRANCIS JARVIS PATTEN, OF NEW YORK, N. Y.

METHOD OF OPERATING ELECTRIC MOTORS.

SPECIFICATION forming part of Letters Patent No. 410,988, dated September 10, 1889.

Application filed July 24, 1889. Serial No. 318,505. (No model.)

*To all whom it may concern:*

Be it known that I, FRANCIS JARVIS PATTEN, a citizen of the United States, residing at New York, in the county of New York and State of New York, have invented certain new and useful Improvements in Dynamo-Electric Machines and Motors, of which the following is a description.

My invention consists, mainly, in a novel method of operating electric motors on alternating-current circuits, by which I secure results not otherwise obtainable, the principal object being to produce an operative self-starting alternating-current motor by a simple modification of the armature-connections of a direct-current machine of any type, and constitutes, essentially, a new method of operating electric motors on an alternating-current circuit, by which such motors may be driven by the rapidly-alternating impulses of such a circuit in a continuous direction, said method involving, essentially, a redirecting of the impulses in the motor-circuits, so that a practically constant current circulates in said circuits, and a constant magnetic relation is preserved between the field-magnet and armature of the machine.

Figure 1:
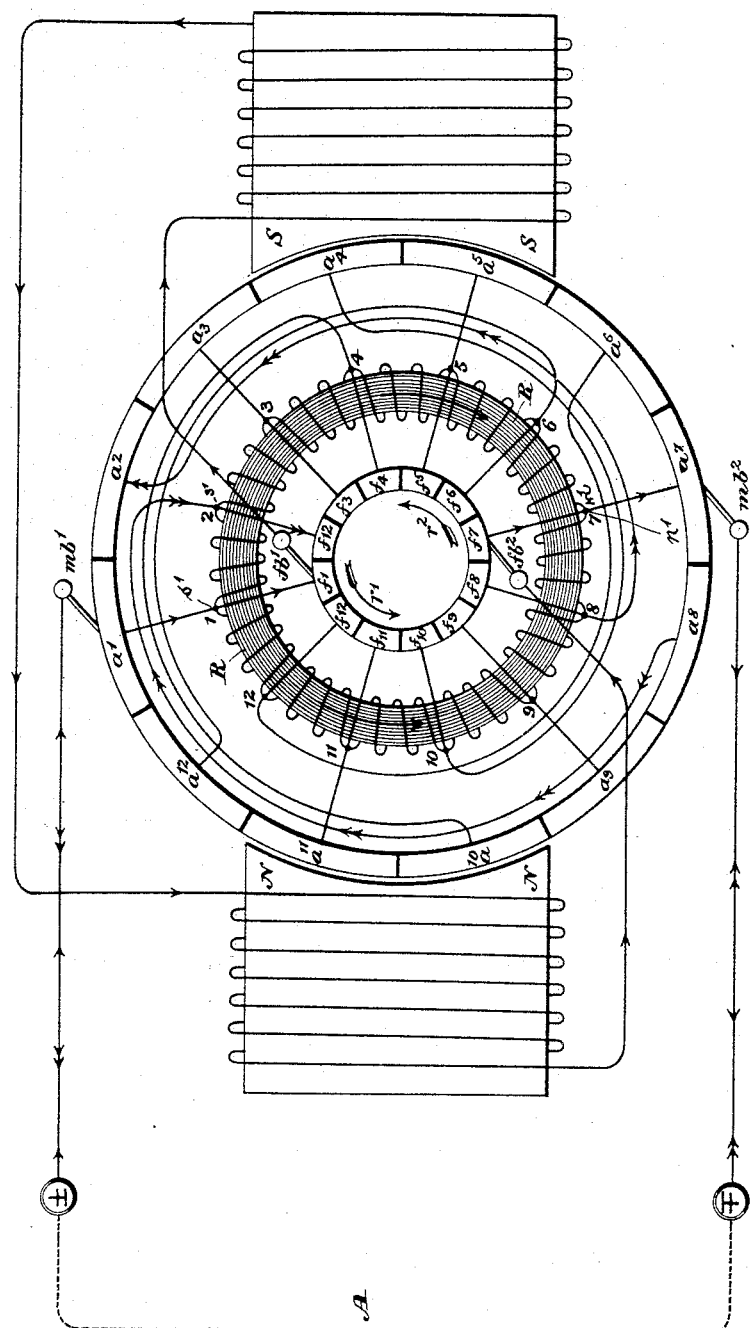
Figure 2:
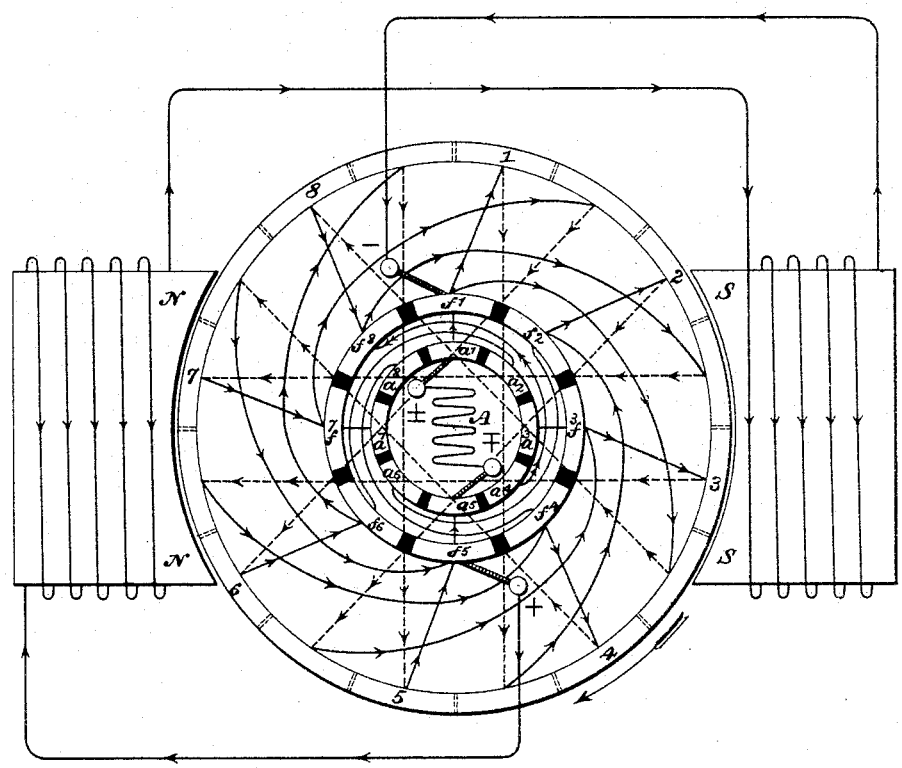
Figure 3:
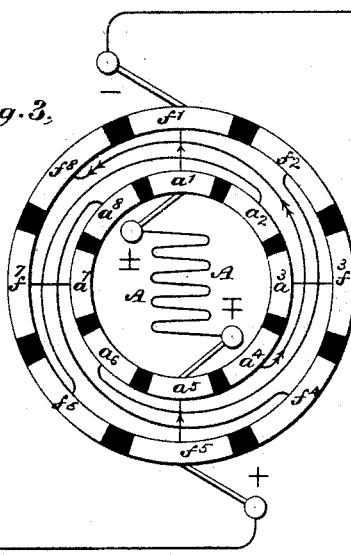

Figure 1 illustrates the method as applied to a machine of the Gramme type. Fig. 2 illustrates the method as applied to a motor having a drum or cylinder winding. Fig. 3 is an enlarged detail sketch of the system of connecting the two commutators.

My object is to produce a simple and efficient alternating-current motor. It is well known that such machines have peculiar qualities—difficulty of starting, synchronous motion necessitating high speed at the start and indifferent direction of rotation of the moving part, rapid reversals of polarity in the cores, inducing heat, with consequent waste of energy, and other defects.

The machine I have invented, as will be made obvious, is a positively self-starting machine. Further, it has but one direction of rotation and cannot start indifferently in either direction. It is not a synchronous machine, and the reversals of current direction do not produce reversals of polarity of any iron when the machine is in motion. It is preferably a single field or two-pole machine, instead of being multipolar, as usual.

In Fig. 1, R R is an ordinary continuous-wound Gramme ring revolving between the two field-poles N N and S S, and it is proposed to so modify the connections of this ring as to produce an alternating-current motor having the qualities above set forth. It is well known that a Gramme ring is essentially a direct-current apparatus, and its so-called "commutator" is actually nothing more than a collector, there being no rectification of the direction of opposed currents, as in other forms of winding, and the ring may be divided into any number of "coils," so called, depending only upon the number of bars in the collector. For convenience the winding of the ring R R is divided into twelve coils, numbered 1 to 12, around the ring to the right, and the ordinary collector of twelve bars is shown inside the ring, connected in the ordinary way to corresponding points of the ring-winding. If, now, current should be caused to flow in the windings of the ring from the upper point $s'$ down to the right and left to the point $n'$, and so out of the ring, such a current would induce in the core of the ring a south pole at $s'$ and a north pole at $n'$, and placed in the field, as shown, rotation would ensue in the direction indicated by the arrows $r'$ and $r^2$, and motion would continue in this direction as long as the current flowed in the same direction through the ring-winding—i. e., from $s'$ downward in the right and left hand halves to $n'$. It is now proposed to bring about this same result with an alternating current which is rapidly reversed in direction by so connecting the same ring to another commutator that the current will still flow continuously in the same direction in the ring-winding, irrespective of its rapid reversal in the external circuit. In other words, it is proposed to maintain a constant unchanged south polarity in the ring at $s'$ and a north polarity at $n'$ by means of an alternating current, and this without rectifying the alternating current by means of a commutator. The result rests upon the following fundamental principle, that if a current of one direction produces a given polarity in a coil, then a current of opposite direction can be made to produce the same polarity in the same coil by sending this reversed current through the same coil in a direction opposite to that in which the first current was sent. Thus, for illustration, if, say, a plus current flowing downward through the coils of the ring from $s'$ to $n'$ produce a south pole at $s'$ and a north pole at $n'$, then a reversed or minus current would produce the same polarity at $s'$ and $n'$ if sent through the ring in the opposite direction—i. e., from the point $n'$ upward to the right and left to $s'$. Now the machine has, besides the ordinary collector $f'$ $f^2$, &c., a commutator of an equal number of bars, (shown outside the ring for convenience at $a'$ $a^2$ $a^3$ to $a^{12}$,) and I call this a "commutator" because it operates to reverse not the currents themselves, as usual, but the points at which opposed currents shall enter the ring, and it is actually a "brush-changer."

In further illustration of the principle used, it may be stated that if an alternating current were sent into a Gramme ring through the brushes bearing on its collector, and the brushes could be made to change position mechanically at each reversal of the current, the machine would then be self-starting, armature polarity would be constant, motion would be continuous, and it would act precisely as when supplied with a direct current. The external commutator $a'$ $a^2$, &c., has precisely this effect, for it is so connected to the winding of the Gramme ring R R that as the brushes $m$ $b'$ $m$ $b^2$ bearing on it pass successively from one segment or bar to the next the current sent to the ring is caused to enter the ring from opposite sides, so that reversed currents sent into the ring-winding through successive segments would maintain a permanent south pole at the point $s'$ and a permanent north pole at $n'$, as, for the reason before explained, opposite currents are caused to flow through the ring in opposite directions. Examining, first, the connections of the Gramme ring to the collector $f'$ $f^2$ $f^3$ and to the commutator $a'$ $a^2$ $a^3$, &c., we find the former connected to the ring-winding as an ordinary Gramme-ring collector. The latter, however, is not so connected, for the segment $a'$ and all the odd-numbered segments are connected direct to the turns of the ring immediately beneath them—segment $a'$ to coil 1 of the ring, $a^3$ to coil 3, $a^5$ to coil 5, $a^7$ to coil 7, $a^9$ to coil 9, and $a^{11}$ to coil 11; but the even-numbered segments are not so connected. Thus segment $a^2$ is connected to coil 8 on the opposite side of the ring from this segment, $a^4$ similarly to coil 10, $a^6$ to coil 12, $a^8$ to coil 2, $a^{10}$ to coil 4, and $a^{12}$ to coil 6 of the ring. Thus all odd-numbered segments are connected to points of the ring-winding immediately beneath or over them, and all even-numbered segments are connected to coils diametrically opposite in position to these segments. If, therefore, positive or plus currents be sent through the ring when odd-numbered coils are in bearing with the brushes, and reversed, negative, or minus currents are sent when even-numbered segments are in bearing with the same brushes, these reversed currents will maintain the polarity of the ring constant. Thus let the terminals $\pm$ and $\mp$ at A be the poles of a source of alternating or reversed currents of any given periodicity, and let it be assumed that the first, say, direct impulse proceeds in the direction shown by the single arrows from $\pm$ through machine-brush $m$ $b'$ to the Gramme ring at the point S' down both sides of the ring to $n'$, out machine-brush $m$ $b^2$, back to source $\mp$ at A. This impulse will make a south pole in the ring at $s'$ and a north pole at $n'$. At the same time current will flow through the shunt field-circuit connected to the brushes $f$ $b'$ and $f$ $b^2$ in the direction shown by the arrows, creating the field N N, S S, as indicated, and under the action of this direct impulse motion will ensue in the direction indicated by the arrows $r'$ $r^2$ opposite the hands of a clock. If, now, it be assumed that under this first impulse the armature turns through the arc covered by one single bar of the collector, and a reverse impulse is sent from the source $\pm$ $\mp$ at A, as indicated by the double arrows $>>$ in the main circuit, then, as the direction of this impulse is opposite to the former, it may be regarded for convenience of analysis as entering the machine at the lower brush $m$ $b^2$, which, after the motion assumed to have taken place under the first impulse, will then be bearing upon the segment $a^8$ of the commutator, and brush $m$ $b'$ will likewise bear upon segment $a^2$, and the current shown by the double arrows will flow in at brush $m$ $b^2$ to segment $a^8$, whence it will go through the auxiliary connection shown around to the opposite side of the ring, entering at coil 2 opposite segment $a^8$, and from this point of the ring it will flow downward on both sides to the right and left in the same direction as before to the point 8 on the ring, then out the auxiliary connection, as shown by the arrows, around to segment $a^2$, and out brush $m$ $b'$, back to source $\pm$ at A, thus completing the circuit in a direction opposite to the former, but still in the same direction in the coils of the ring, and so maintaining with this reversed impulse a south polarity in the ring at $s'$ and a north polarity at $n'$, as before. Thus motion will continue in the same direction as before, providing the field-poles have not been changed; but the field-circuit is connected to the brushes $f$ $b'$ $f$ $b^2$, which bear upon the ordinary Gramme collector, and as we have seen that current must always flow in the same direction through the ring with these reversed currents, it must likewise flow in the same direction from the brushes $f$ $b'$ $f$ $b^2$, bearing upon the ordinary collector of this ring. Therefore with alternating currents in the external circuit there will always be currents of one direction in the ring itself flowing uniformly and constantly down both sides from $s'$ to $n'$, and likewise out the brushes $fb'\,fb^2$, maintaining a constant field N N, S S, as shown. We have therefore practically a direct-current motor on an alternating-current circuit resulting from a system of connections which has practically the effect of shifting the brushes in position from one side of the ring to the other at each reversal of the current; and this system of connections constitutes an important modification of the Gramme machine, for while such a system makes the ring absolutely inoperative with a direct current it renders it operative with an alternating current. It will be observed, however, that if the brushes $m\,b'$ and $m\,b^2$ be lifted off the commutator $a'\,a^2$, &c., and the terminals of a direct-current circuit be connected to the brushes $f\,b'$ and $f\,b^2$, the machine then becomes an ordinary direct-current Gramme motor, with the fields in shunt relation to the armature, and the machine thus loses none of its value as a direct-current motor, while by the addition of the reversely-connected brush-changer $a'\,a^2$, &c., to the ordinary Gramme machine it can be used as an ordinary direct-current motor or as an alternating-current motor at pleasure.

My invention therefore consists in adding to an ordinary armature and collector connected in the usual way an additional or auxiliary collector having the same number of bars as the former, but with successive bars connected to diametrically-opposite points of the continuous ring-winding.

Fig. 2 shows the application of the system or method to an ordinary direct-current motor having any form of cylinder or drum armature winding, the Froelich winding being selected for illustration. The connections are the same as in the figure previously described, except that the ordinary commutator $f'\,f^2$, &c., is shown outside, and the other reversely-connected commutator is shown inside, and this auxiliary commutator, which I designate as a "brush-changer," instead of being connected to the winding of the armature, is connected to corresponding bars of the other collector, which amounts, in fact, to the same thing, and the source of alternating current $\pm$ and $\mp$ A is shown inside the latter ring ------. The arrow-heads indicate the direction of current-flow throughout the winding.

In Fig. 3 is shown an enlarged view of the system of connecting the two sets of commutators to each other, the outside ring being the ordinary direct-current commutator, the inside one being the reversely-connected brush-changer.

I will now explain why the machine is a self-starting one with an alternating current; why it will not turn indifferently in either direction, but has a single direction of rotation with such a current; why there is never with the machine in motion any reversal of the polarity of the iron cores, and why the machine is not a synchronous motor. It is well known that any such form of direct-current motor will start when actuated by an alternating current, for if a plus impulse induces the polarities shown, N N, S S in the field and $s'\,n'$ in the armature-ring, and the machine remains motionless until a reversed current is sent, then both the field and armature polarities are reversed simultaneously, and the tendency to motion is still in the same direction as indicated by the arrows. The tendency to motion is therefore continuous and in the same direction, polarities of the iron masses being reversed at each reversal of current until the machine starts; but, once started, these polarities are all constant. The machine therefore starts as an ordinary direct-current machine connected in an alternating-current circuit. The reasons just given explain, also, why the machine cannot move indifferently in either direction. They also explain why there is no change of magnetic polarity in the iron cores after the machine has moved through the arc covered by one collector-bar.

It remains to show why the machine is not synchronous with the generator and does not have to start at the same speed as the generator. From the analysis given it is evident that when in motion, as contemplated, one bar of the collector must pass under the brushes at each reversal of current. The number of collector-bars therefore represents the number of current reversals that correspond to a single complete revolution of the motor-armature. Thus, let it be supposed for illustration that the source of alternating current at A is an alternating-current dynamo having ten field-poles and a speed of fifteen hundred revolutions per minute. There will be ten reversals of current produced in each revolution of the dynamo-armature. If, therefore, the Gramme ring be provided with a collector having thirty bars it will make one revolution for thirty reversals of current, and will therefore make one revolution in the same period of time that the dynamo-armature makes three revolutions, and if the dynamo speed is assumed to be fifteen hundred per minute the motor speed will be five hundred per minute and constant, and the speed of the motor will always be defined by the ratio of the number of current reversals produced in a single revolution of the dynamo to the number of collector-bars connected to the ring.

I claim—

1. The method of operating an electric motor connected in an alternating-current circuit, which consists in giving a constant polarity to a continuously-wound armature by delivering the alternating impulses successively to opposite sides of the armature-winding.

2. The method of operating an electric motor connected in an alternating-current circuit, which consists in giving a constant polarity to a continuously-wound armature-circuit by sending the opposite impulses of current successively to opposite sides of the armature-winding, and in giving a constant polarity to the field-magnet by a similar and simultaneous delivery of the same impulses to the field-circuit.

In testimony that I claim the foregoing as my invention I have hereunto set my hand, this 17th day of July, 1889, in the presence of two witnesses.

FRANCIS JARVIS PATTEN.

Witnesses:
W. M. MINER,
A. B. FRENZEL.